United States Patent
Horne et al.

(10) Patent No.: US 11,580,864 B2
(45) Date of Patent: Feb. 14, 2023

(54) TAKE-OFF PERFORMANCE PREDICTION AND ALERTING SYSTEM

(71) Applicant: Gulfstream Aerospace Corporation, Savannah, GA (US)

(72) Inventors: Thomas C. Horne, Savannah, GA (US); Thomas F. Landers, Savannah, GA (US); Thomas P. Lavrisa, Savannah, GA (US); Suzanne Swaine, Savannah, GA (US)

(73) Assignee: Gulfstream Aerospace Corporation

( * ) Notice: Subject to any disclaimer, the term of this patent is extended or adjusted under 35 U.S.C. 154(b) by 245 days.

(21) Appl. No.: 16/947,852

(22) Filed: Aug. 20, 2020

(65) Prior Publication Data

US 2022/0058963 A1 Feb. 24, 2022

(51) Int. Cl.
*G08G 5/00* (2006.01)
*B64D 43/00* (2006.01)
*B64D 45/00* (2006.01)

(52) U.S. Cl.
CPC .......... *G08G 5/0065* (2013.01); *B64D 43/00* (2013.01); *B64D 45/00* (2013.01)

(58) Field of Classification Search
CPC .................................................. G08G 5/0065
See application file for complete search history.

(56) References Cited

U.S. PATENT DOCUMENTS

| | | | | |
|---|---|---|---|---|
| 5,353,022 A | * | 10/1994 | Middleton | G08G 5/025 701/15 |
| 10,202,204 B1 | * | 2/2019 | Daidzic | B64C 5/02 |
| 10,214,300 B2 | * | 2/2019 | Feyereisen | B64C 25/42 |
| 10,429,856 B2 | * | 10/2019 | Guedes | G01C 23/00 |
| 11,287,283 B2 | * | 3/2022 | Goupil | G05B 17/02 |
| 2022/0058963 A1 | * | 2/2022 | Horne | B64D 45/00 |

\* cited by examiner

*Primary Examiner* — Michael A Berns
(74) *Attorney, Agent, or Firm* — LKGlobal | Lorenz & Kopf, LLP

(57) ABSTRACT

The aircraft take-off awareness system predicts and informs the pilot about where on the runway certain safety speeds will be achieved. A processor coupled to receive inertial data from the aircraft computes an aircraft weight estimate based at least in part upon the inertial data. The processor then computes a future acceleration prediction based on the computed aircraft weight estimate. Using the future acceleration prediction, the processor then computes the position of various warning reference distances corresponding to predicted positions on the runway at which said certain safety speeds will be achieved. The processor generates a display that it dynamically updates as the reference distances change as the aircraft proceeds down the runway during take-off or aborted take-off.

20 Claims, 8 Drawing Sheets

| Segment | | M & Q | FN | μ | $C_L$ | $C_D$ | γ & α | $F_{fric}$ |
|---|---|---|---|---|---|---|---|---|
| A | BR to VEF (AEO) | Increasing | AEO (FN x 2) <u>Valid for all segments:</u> Thrust decreases as Mach increases and vice versa. | Rolling Friction Coefficient | | | | Some runway contaminants will cause impingement drag while wheels are in contact with the ground; this drag is proportional to the speed of the aircraft |
| B | VEF to V1 (OEI) | Increasing | OEI (FN x 1) | Rolling Friction Coefficient | | | | |
| C | VEF to V1 (AEO) | Increasing | AEO (FN x 2) | Rolling Friction Coefficient | Constant | Constant | Pitch due to runway slope assumed to be constant, angle of attack remains relatively constant | |
| D | V1 to Full Stop (OEI) | Decreasing | OEI (FN x 1) TRs briefly applied | Braking Coefficient | | | | |
| E | V1 to Full Stop (AEO) | Decreasing | AEO (FN x 2) TRs briefly applied | Braking Coefficient | | | | |
| F | V1 to VR (OEI) | Increasing | OEI (FN x 1) | Rolling Friction Coefficient | | | | |
| G | VR to VLOF (OEI) | Increasing | OEI (FN x 1) Horizontal thrust vector is a function of pitch | Rolling Friction Coefficient | Changes as a function of angle of attack | Changes as a function of angle of attack | As the aircraft rotates from VR through V2, the angle of attack, pitch angle, and flight path angle will all change | None |
| H | VLOF to V2 (OEI, in-flight) | Increasing | OEI (FN x 1) Horizontal thrust vector is a function of pitch | None | | | | |

Fig. 7

TAKE-OFF PERFORMANCE PREDICTION AND ALERTING SYSTEM

TECHNICAL FIELD

The disclosure relates generally to aircraft take-off alerting systems. More particularly, the disclosure relates to instrumentation to assist the pilot during aircraft take-off, by providing visual and/or audible notification, in real-time, of whether take-off can be safely achieved at the current engine thrust, and whether there is room on the runway to achieve take-off or alternatively to abort take-off and come to a stop.

BACKGROUND

This section provides background information related to the present disclosure which is not necessarily prior art.

Aircraft take-off is a high energy event. Carrying passengers, cargo, and fuel, the aircraft at take-off is at its highest weight. At take-off, the engines are set to produce thrust sufficient to achieve V1, the take-off safety speed, also called the take-off decision speed. The pilot releases the brakes at one end of the runway and the aircraft begins to accelerate from a standstill, rapidly increasing in velocity until the V1 velocity is reached. At this point the pilot is safe to rotate the nose up to increase angle of attack and the aircraft will begin to climb at a comfortable pitch.

During take-off the runway plays an important role, because until the liftoff, the aircraft is in contact with the runway. If the runway surface is covered with water, wet snow or slush, this will produce contaminant drag, causing the aircraft to accelerate more slowly. If the runway is inclined (not level), this will also affect the aircraft acceleration. An upwardly inclined runway reduces the net acceleration for a given amount of thrust, due to the pull of gravity. A downwardly inclined runway increases net acceleration for a given amount of thrust, again due to the pull of gravity.

Factors Affecting Thrust

Jet engines produce thrust by establishing a pressure differential between the air intake feeding the compressor and the propelling nozzle expelling the high velocity exhaust gases. A useful measure of this pressure differential is the engine pressure ratio (EPR), measured as the ratio of the total pressure at the exit of the propelling nozzle divided by the total pressure at the entry of the compressor. Engine pressure ratio has a direct bearing on the amount of thrust produced by the engine.

When the runway is situated at or near sea level, the air is dense—more mass per unit volume (density). When the runway is situated at a high mountain elevation, the air is rarified—less mass per unit volume. This difference in air mass density results in a different mass flow rates at sea level vs high elevations, and this difference affects the amount of thrust produced. To complicate matters, setting elevation differences a side, air pressure at any location is rarely constant, but varies as barometric pressure changes under different weather conditions.

Other factors affecting thrust are ambient air temperature, humidity, and the speed of the aircraft itself. Humidity is a measure of the amount of water vapor in the air. Water vapor adds mass to the air and thus alters to the mass flow rate, affecting thrust. During take-off, the mass flow rate is also changing as the aircraft's speed increases. Aircraft speed is often expressed in Mach number, which is the ratio of the aircraft velocity divided by the speed of sound at that atmospheric condition (i.e., temperature).

The Aborted Take-Off

As a matter of routine take-off planning, the pilot inputs the weight of the aircraft into the engine control computer system. Ambient temperature is also input, either by the pilot or via a sensor on the aircraft. The engine control computer then determines the power setting needed to develop the required amount of thrust to achieve take-off. This calculation may be optimized to extend engine life, so a minimum power setting sufficient to achieve the V1 take-off velocity in the runway available can be computed.

Aircraft runways are designed with sufficient length to allow an aircraft to achieve take-off rotation speed and lift off before reaching the end of the runway. Take-off being the goal, pilots are typically aware of their V1 speed and will not normally abort take-off once the V1 speed is achieved. However, there are exceptions to this where the pilot may need to abort.

One reason to abort is engine failure. Although very uncommon, if an engine fails during take-off, the pilot will try to bring the aircraft to a stop, while there is still remaining room on the runway. Another reason to abort might be a fire in the cabin, which might cause a pilot to desire an abort even if the aircraft speed is above V1. If the pilot can safely stop on the runway, this can usually be done quickly (on the order of 15-20 seconds). If there is insufficient remaining runway to come to a stop, the only viable option is to take off, and come back in for a landing. Considerably more time is required for this maneuver (on the order of 5-6 minutes). In a cabin fire emergency, the difference between 15-20 seconds and 5-6 minutes could be crucial.

When aborting take-off due to engine failure or other emergency, the pilot must be keenly aware of how much runway remains for bringing the aircraft to a safe stop. Pilots use the term refusal point to denote the last point down the runway at which the plane can be safely brought to a stop. The refusal point is not fixed; but depends on the aircraft's current momentum and stopping capability.

From the foregoing it will be appreciated that the V1 safety take-off speed and the refusal point are important references for the pilot to be mindful of, and there are others. In a trouble-free take-off, the V1 speed is achieved automatically, and the refusal point never comes into play. However, in times of emergency the safety take-off speed, refusal point, and a number of other needed runway related criteria can be very difficult for the pilot to ascertain in the split seconds when needed. Present day runway excursion and take-off avionics systems do not provide much useful guidance in this regard.

SUMMARY

The disclosed take-off performance prediction and alerting system puts the pilot in a much better position to understand precisely how far down the runway the aircraft will achieve its safe take-off speed, where the refusal point is located given the aircraft's current speed, and a number of other runway-related conditions. The disclosed system determines these important points using real-time data that are not reliant on pilot-entered estimates of aircraft weight and not reliant on assumptions based on expected acceleration for a given engine throttle setting. Rather the disclosed system iteratively performs continuous estimations of aircraft weight and iteratively performs continuous estimates of aircraft acceleration. The system computes these iteratively performed estimations without relying on pilot-entered aircraft weight or use of assumptions about the runway conditions that may not be accurate.

The disclosed system computes an independent estimate of aircraft weight and instantaneous acceleration and uses this information to assess whether the remaining runway length is sufficient for take-off. The disclosed system also uses these independent estimates of aircraft weight and instantaneous acceleration to determine where the refusal point is currently located. In addition, the disclosed system also computes predictions of the aircraft's future acceleration, which is then used to determine where other important runway-related criteria such as the accelerate-stop and accelerate-go points needed for decisions in the event of engine failure.

Thus, when the take-off run begins, based on the aircraft acceleration and the thrust being developed, the weight of the aircraft is estimated. Based on the weight, the take-off speed is then estimated. As air data becomes available, the speed-change required to achieve take-off speed is computed, and the distance needed. With knowledge of the runway end points, the location of the point where take-off speed will be achieved can be compared to the runway boundaries. Deviations of this computed information to planning data or physical constraints can be brought to the attention of the crew as deemed necessary.

According to one aspect, the disclosed aircraft take-off awareness system predicts and informs the pilot about where on the runway certain safety speeds will be achieved. It does so by employing a processor coupled to receive inertial data from the aircraft and programmed to compute an aircraft weight estimate based at least in part upon the inertial data. The processor is programmed to compute a future acceleration prediction based on the computed aircraft weight estimate, and then to compute and inform the pilot about at least one warning reference distance using the computed future acceleration prediction, the warning reference distance corresponding to predicted positions on the runway at which said certain safety speeds will be achieved.

According to another aspect, the disclosed method determines the location along a runway at which certain speeds will be achieved. The method employs a processor to perform the following steps: computing an aircraft weight estimate based at least in part upon inertial data obtained from inertial sensors onboard the aircraft; computing a future acceleration prediction based on the computed aircraft weight estimate; and computing at least one warning reference distance using the computed future acceleration prediction, the warning reference distances corresponding to predicted positions along the runway at which said certain safety speed will be achieved.

BRIEF DESCRIPTION OF THE DRAWINGS

The drawings described herein are for illustrative purposes only of selected embodiments and not all possible implementations. The particular choice of drawings is not intended to limit the scope of the present disclosure.

FIG. 7 is a chart showing which factors of the estimated acceleration the processor uses to compute estimated distances depending on segment;

DETAILED DESCRIPTION

The disclosed take-off performance prediction and alerting system provides valuable information to the pilot prior to and during take-off. The system provides visual and audible alerting messages in sufficient time for the pilot to take corrective actions or to safely abort a take-off. The awareness display provides an indication of margin available. In this way mishaps caused by improper distance, speed and acceleration management during take-off can be avoided. The system provides awareness of the take-off refusal point as well as the point at which the V1 safe take-off speed and subsequent liftoff will be achieved relative to the runway.

Figure 1:
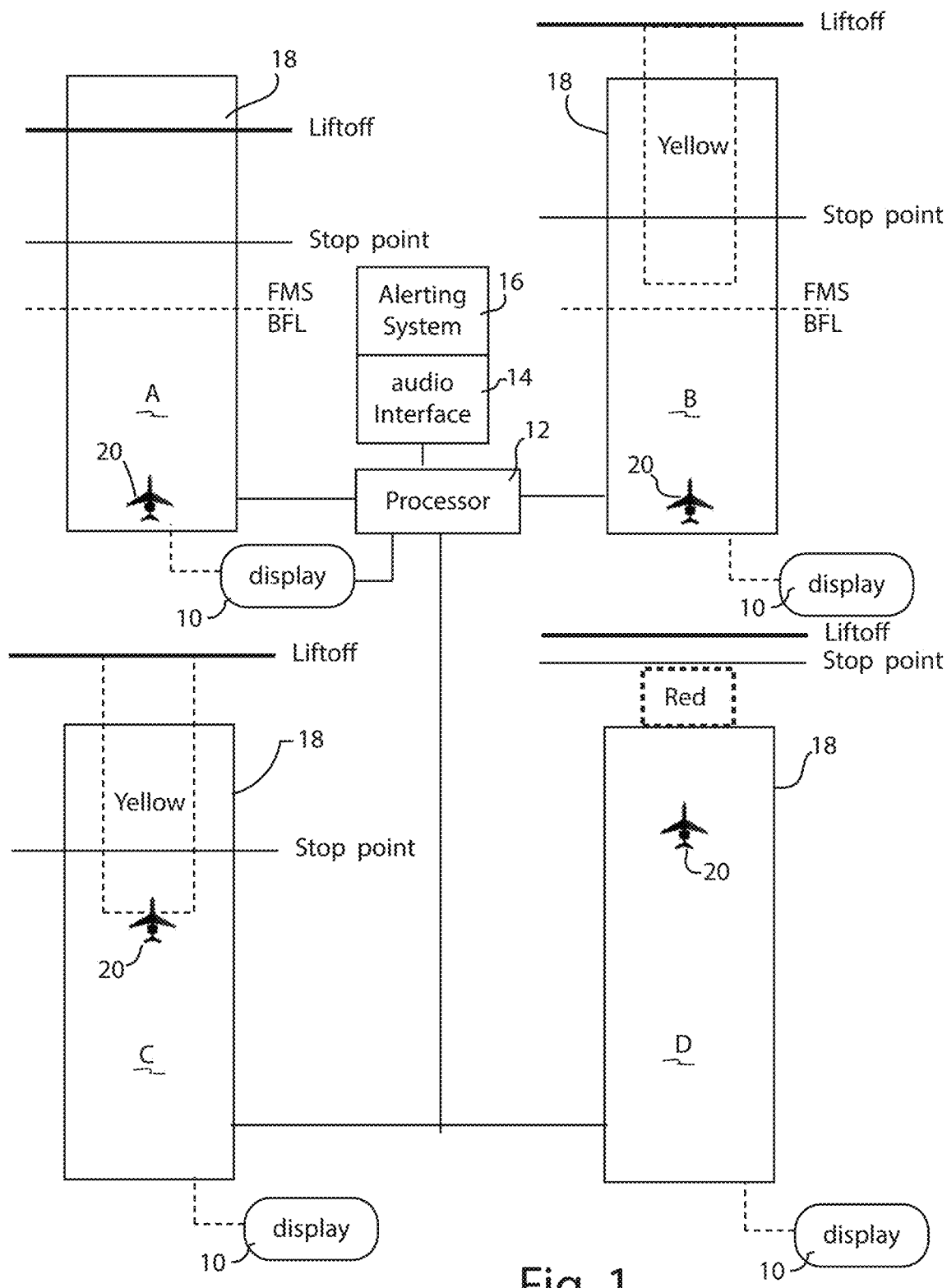
FIG. 1 illustrates four different display frames generated by the disclosed alerting system corresponding to different take-off alerting conditions.

Although the specifics of the instrumentation display can be varied, an exemplary instrument display for the take-off performance prediction and alerting system is illustrated in FIG. 1. The instrumentation includes a flight deck mounted display 10 driven by processor 12, which may be implemented using executable code running on an existing aircraft computer system, or using standalone microprocessors, or logic gating circuits implemented, for example, using a field programmable gate array (FPGA) devices, or combination of these components. The term processor 12 will be hereinafter used to refer to such computer system, microprocessors, FPGA devices or combinations thereof. Details of how the processor 12 is programmed to perform the disclosed functions are presented later below. If audible alerts are required in addition to the visual display, the processor provides an audio interface 14 which may be coupled to the aircraft alerting system 16.

In a basic embodiment, the visual display 10 presents a simple rectangular image to represent the runway 18. An aircraft icon 20 is rendered upon the runway 18 to show the aircraft's current position on the runway. The processor continually recomputes this position as the aircraft proceeds down the runway. The processor also computes a series of other horizontal reference lines, preferably labeled and presented in different colors, to show the current locations of applicable reference distances, such as the point at which V1 and subsequent liftoff is predicted to be achieved, where the predicted refusal point (stop point) is located. Other helpful information can also be presented, such as the balanced field length (BFL) indicator, typically supplied by the flight management system (FMS). Each of these reference distance lines or markers can be displayed or suppressed by the processor 12 according to predetermined rules designed to show the pilot only the information that will be useful at that moment. In addition to these reference lines, the processor also displays warning overlays, preferably in different colors, to alert the pilot when certain predetermined conditions have occurred. These warning overlays are shown as dotted rectangles in FIG. 1.

In FIG. 1 a series of exemplary take-off scenarios have been illustrated, side-by-side, to better show that the visual display generated by the processor is a dynamic display—the aircraft icon moves down the runway, the horizontal reference lines move locations as the aircraft proceeds, and in certain cases warning overlays are presented. These exemplary take-off scenarios represent the following cases, which have been labeled A, B, C and D in FIG. 1:

| Scenario | Stop Point Location | Liftoff Point Location | Warning Overlay |
|---|---|---|---|
| A | On runway | On runway | No alerts |
| B | On runway | Beyond runway | Yellow caution |
| C | On runway | Beyond runway | Yellow caution |
| D | Beyond runway | Beyond runway | Red warning |

In these scenarios, note that the position of the aircraft icon 20 is advancing in each successive scenario. Also note that in some scenarios the FMS BFL line is suppressed by the processor to simplify the display when awareness of this reference is not needed. Note in Scenario B how the pilot is warned that predicted liftoff occurs beyond the runway, even before the plane has entered the Yellow warning region. This gives the pilot more time to react and take corrective action before the stop point is reached.

As noted, the display is dynamic. The displayed information changes as the aircraft proceeds down the runway. However, the take-off performance prediction and alerting system provides important alerting information even before take-off has commenced. If the system detects that the liftoff point or the stop point are beyond the runway before take-off has commenced, an immediate red warning condition is displayed and also sent to the audible alert system. This scenario might happen, for example, if the pilot entered the wrong (shorter) runway for take-off or erroneously turned right instead of left when entering the active runway at an intersection, thus accidentally having far less runway length to work with.

To perform these safety functions, the processor 12 obtains the current aircraft position from onboard systems such as the aircraft GPS receiver. The processor obtains the runway endpoints from stored map data, which are referenced to the aircraft position. However, in order to produce the dynamic display depicted in FIG. 1, the processor must perform a kinematic analysis of the aircraft motion. This is done using the known engine thrust to determine aircraft acceleration produced by that thrust, taking drag and other factors into account. Once the acceleration is known, the processor is then able to make assessments of what the aircraft velocity will be at future locations down the runway and compare these velocities to the V1 take-off velocity.

Determining aircraft acceleration in a reliable manner is not as simple as it might first appear. According to Newton's laws of motion, acceleration is proportional to the ratio of the net forces acting on the aircraft, divided by the aircraft's mass or weight:

$$\text{Acceleration} = (\text{thrust} - \text{drag})/\text{Weight}. \quad \text{Eq. 1}$$

Although the above calculation appears simple, in practice knowing the weight of the aircraft by no means simple. Normally the pilot will enter the approximate weight of the aircraft into aircraft computer systems prior to take-off. This approximate weight is an estimate based on the operating empty weight of the aircraft, to which is added the weight of fuel, cargo, passengers and carry-on items. The biggest variable in this estimate is typically the weight of the passengers and their carry-on items and personal effects.

Instead of relying on this approximate weight, the processor 12 performs an independent, dynamic assessment to provide an estimate of the fully loaded aircraft weight. As discussed below, this dynamic assessment uses inertial sensors and other on-board sensors to determine aircraft weight by observing how the aircraft moves in relation to the thrust applied. Thus the system does not need to guess at the weight of the passengers and their carry-on items and personal effects. This independent estimate of the weight can be used to confirm the pilots are using the correct take-off speeds, and provide timely and appropriate alerting if there is cause for concern.

Then using this dynamically assessed weight (or the piloted entered weight if conditions do not permit the dynamic weight assessment), the processor uses a second dynamic assessment to estimate the future aircraft acceleration at locations down the runway which the aircraft has not yet reached. With this ability to predict future acceleration of the aircraft at future locations down the runway, the processor is then able to quite accurately predict aircraft velocities at future locations down the runway. These velocities are then be used to predict where the V1 safety take-off velocity will be achieved, and where other pertinent reference distances, such as the refusal point, will be located.

The disclosure which follows is divided into five major sections. The first section explains how the processor 12 is programmed to estimate the aircraft weight using the processor-implemented weight determination algorithm. The second section then explains how the processor 12 is programmed to predict future acceleration. The third section provides an explanation of how the processor is programmed to use estimated acceleration to compute the dynamically updated stop point and liftoff point reference lines for the display depicted in FIG. 1. The fourth section summarizes the process performed by the processor according to the disclosed method. The fifth section concludes with some example use cases.

Aircraft Weight Estimation

Figure 2:
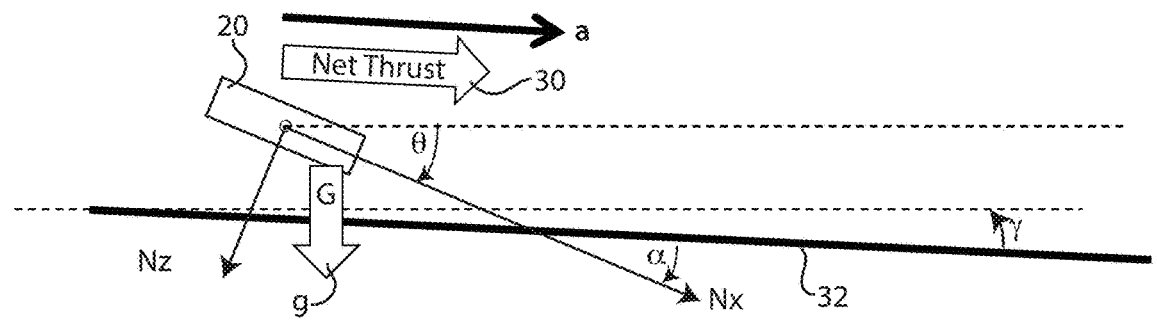
FIG. 2 is a free body diagram useful in understanding how the performance prediction system estimates aircraft weight.

Instead of relying on a weight estimate provided by the pilot, the take-off performance prediction and alerting system estimates the aircraft weight by calculation based on other measured and estimated parameters. To understand the aircraft weight estimation, refer to FIG. 2, which depicts a free body diagram of the aircraft 20, showing various force vectors acting on the aircraft. In FIG. 2 the following variables, constants and angles are used.

| | |
|---|---|
| a | Acceleration of aircraft |
| g | Gravitational acceleration |
| Net Thrust | Engine thrust minus Drag |
| $N_x$ | Inertial acceleration in x dimension of aircraft body-axis reference frame as measured by on-board inertial sensor. |
| $N_z$ | Inertial acceleration in z dimension of aircraft body-axis reference frame as measured by on-board inertial sensor. |
| θ | Angle of airplane relative to inertial reference frame |
| γ | Angle of airplane movement vector in vertical plane relative to inertial reference frame |
| α | Nose up angle relative to runway |

Current Acceleration Estimation

In making the estimated weight calculation, the processor calculates an estimate of the aircraft's current acceleration, using information obtained from the aircraft's on-board inertial sensors. As will be described, the vector direction of this estimated acceleration may not always align with the inertial reference frame provided by the inertial sensors, due to inclination angle of the runway and pitch angle of the aircraft as it rests on its wheels. These angular factors are accounted for by the processor in computing the acceleration estimate.

Keep in mind that the current acceleration estimate, discussed here, refers to the acceleration of the aircraft at its current position. This current acceleration estimate should not be confused with a predicted future acceleration, which is the subject of the "Future Acceleration Prediction" algorithm described in the second section later below.

In FIG. 2, the aircraft 20 is acted upon by several forces, namely gravity g and the net thrust 30—being the vector sum of the engine thrust and drag. The aircraft acceleration produced by the net thrust is depicted by the bold arrow line, labeled a. As noted above, the aircraft employs an onboard inertial sensor which measures the aircraft movement in space, and which may be expressed as a vector quantity. Specifically, the inertial sensor supplies a measure of acceleration in the aircraft body-axis reference plane Nx, as illustrated in FIG. 2 by the arrow-tipped solid line labeled $N_x$.

The runway 32 may not be level relative to the inertial reference frame. It could be sloped upwardly or downwardly, for example. Thus, when the aircraft is at rest on the runway, or in rolling contact with the runway, it inherits the runway's upward or downward slope relative to the inertial reference frame, represented by the angle θ. If the angle θ is non-zero, the $N_x$ acceleration will be non-zero, even when the plane is at rest. This is because the $N_x$ value includes a non-zero component attributable to the acceleration of gravity g, as seen by Eq. 2.

$$N_x = a \cos\theta + g \sin\theta \qquad \text{Eq. 2}$$

In the case of a level runway, where θ is zero, the equation simplifies to:

$$N_x = a \qquad \text{Eq. 2a}$$

Solving Eq. 3 for acceleration yields the following:

$$a = (N_x - g \sin\theta)/\cos\theta \qquad \text{Eq. 2b}$$

However, this representation of acceleration does not take into account the possibility that the aircraft may be moving at some non-zero angle γ in the vertical plane, relative to the inertial reference frame. If such a non-zero angle exists, then the total acceleration of the aircraft will have a component due to gravity, which must be accounted for as follows:

$$a = (N_x - g \sin\theta)/\cos\theta - g \sin\gamma \qquad \text{Eq. 3}$$

Engine Thrust Estimation

The processor 12 estimates engine thrust based on data it obtains from aircraft sensors and stored values contained in on-board look-up tables. More specifically, engine thrust is a function of engine pressure ratio (EPR), aircraft speed (which can be expressed as a Mach number) and altitude of the aircraft—which in this case is the altitude at the runway.

Engine thrust $F_n$ is often expressed as normalized to the pressure ratio δT and can be calculated as a function of EPR and Mach number.

$$F_n/\delta T = f(\text{EPR}, \text{Mach}) \qquad \text{Eq. 4}$$

In Eq. 4, $F_n$ represents Engine Net Thrust, δT represents Ratio of Total Pressure at Flight Condition to sea level Ambient Pressure, EPR represents Engine Pressure Ratio from Cockpit, and Mach represents Mach Number from Cockpit.

The processor 12 uses the Mach number and Altitude, to compute Total Pressure and δT. The processor uses the EPR and Mach number to access a lookup table to ascertain the ratio Fn/δT. Then using the computed δT value, the processor then computes the net engine thrust Fn.

Drag Estimation

The processor 12 estimates drag using the drag equation Eq. 5 below. The calculation takes air density ρ, the velocity v, the wing Area and the drag coefficient Cd of the aircraft according to the following equation:

$$D = Cd(\rho v^2)/2 * \text{Area}, \qquad \text{Eq. 5}$$

where Cd is determined a priori for each different aircraft model.

Eq. 5 is a basic drag equation, suitable for weight estimation. However, if desired, a more detailed drag equation may be used to take into account other frictional forces. Such a more detailed equation is presented in the Future Acceleration Prediction section below.

Computing Weight Estimation

To perform a dynamic assessment of aircraft weight, the processor 12 uses the following relationship, derived from Eq. 1.

$$\text{Weight} = (\text{thrust} - \text{drag})/\text{acceleration} \qquad \text{Eq. 6}$$

In computing aircraft weight according to Eq. 6, the processor uses the acceleration, engine thrust and drag values it previously calculated as discussed above.

With reference to FIG. 2, it can be seen that the vector direction of the acceleration will not typically be the same as the vector direction of the thrust, unless the aircraft is level with respect to the runway, and may also vary if the engine thrust line is not parallel to the aircraft body axis. The thrust produced by the engines will be directed at an angle α relative to the runway. To account for this, Eq. 6 must be modified to multiply thrust by a cos α term.

$$\text{Weight} = (\text{thrust} \times \cos\alpha - \text{drag})/a \qquad \text{Eq. 6a}$$

To simplify Eq. 6a, we can define the term Net Thrust:

$$\text{Net Thrust} = F_n \cos\alpha - \text{drag}, \qquad \text{Eq. 7}$$

where $F_n$ is the engine thrust.

Then substituting Net Thrust into Eq. 6a, Weight W can be expressed as follows:

$$W = \text{Net Thrust}/a + g \sin\gamma \qquad \text{Eq. 6b}$$

Figure 3:
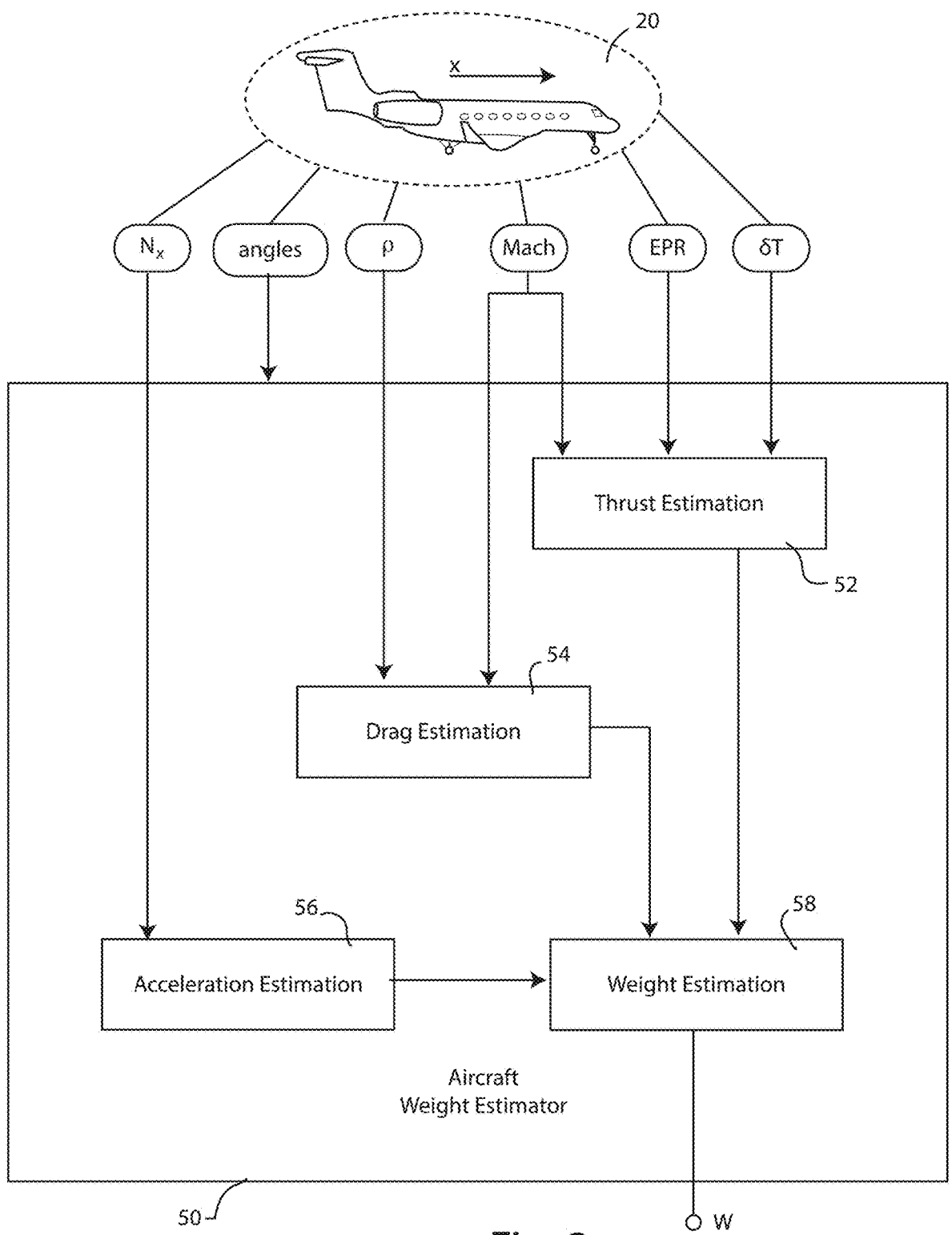
FIG. 3 is a block diagram giving an overview of how the processor of the performance prediction system estimates aircraft weight.

The processor 12, using its estimates for current acceleration, engine thrust Fn and drag, the processor reads or estimates the current angle values for θ, γ and α and calculates the estimated aircraft weight using Eq. 6b. FIG. 3 summarizes how the processor 12 is programmed as an aircraft weight estimator 50, to make the aircraft weight estimation based on the calculations discussed above. As illustrated the processor obtains Mach, EPR and δT from sensors onboard aircraft 20. These are used to perform the thrust estimation process 52, as discussed above in the section, Engine Thrust Estimation. In addition, FIG. 4 explains the weight estimation calculation in more detail.

Referring to FIG. 3, the processor 12 also obtains the Mach value from the aircraft 20 to perform the drag estimation process 54, as discussed above in the Drag Estimation section and also shown in FIG. 4 discussed below. The processor 12 also obtains the $N_x$ and θ values from the sensors onboard the aircraft 20 to perform the acceleration estimation process 56, as discussed above in the Current Acceleration Estimation section and also shown in FIG. 4 discussed below. Then armed with the results of each of processes 52, 54 and 56, the processor performs the weight estimation process 58, using the analysis discussed above in the Computing Weight Estimation section and also shown in FIG. 4 discussed below. The output of the weight estimation process 58 is supplied as the estimated weight W, used in the future acceleration prediction analysis. Note that if the runway condition is not dry, the drag from the wheels may be difficult to accurately predict and may render the weight estimate invalid. In those conditions, the pilot entered weight must be used in the subsequent computations and an independent check of take-off speeds cannot be performed.

Figure 4:
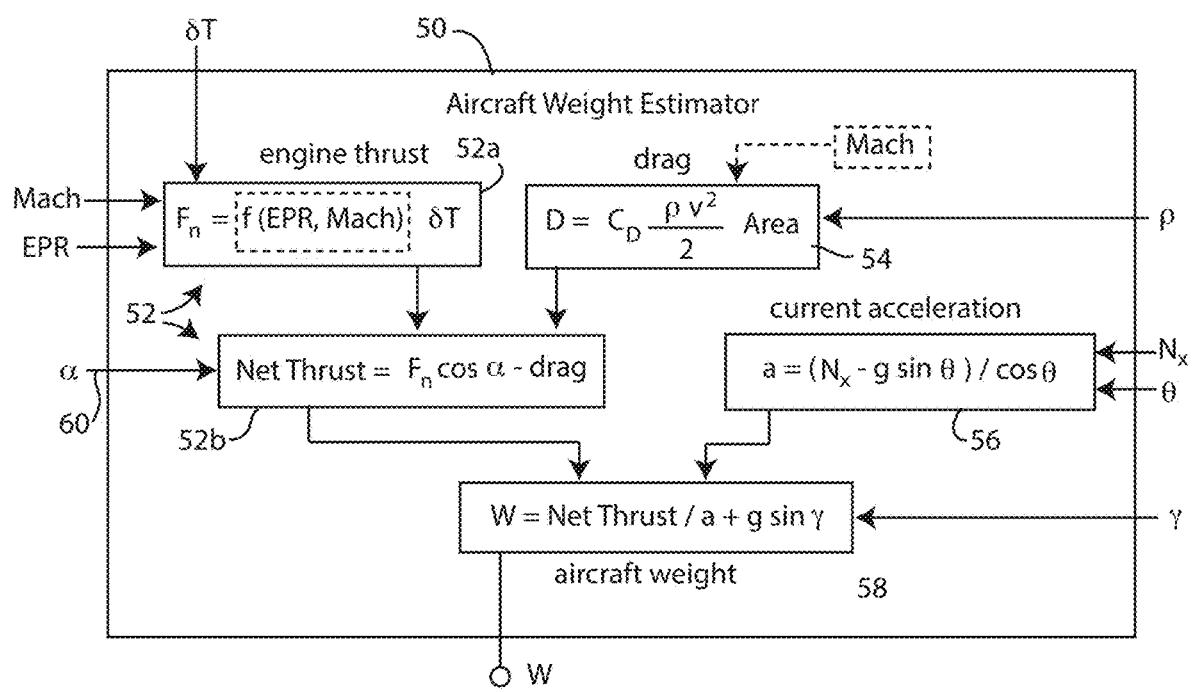
FIG. 4 is a detailed data flow diagram illustrating how the processor computes the aircraft weight estimate.

With reference to FIG. 4, the aircraft weight estimator 50, implemented by processor 12, is shown in greater detail. Each block describes the analysis the processor 12 performs at each of these process steps: thrust estimation 52, drag estimation 54, acceleration estimation 56 and weight estimation 58. Note that the thrust estimation process 52 is subdivided in FIG. 4 into an engine thrust calculation process 52a and a net thrust calculation process 54b. FIG. 4 also shows in greater detail how each of the angles (referenced collectively in FIG. 3) are used in the aircraft weight estimator 50.

Future Acceleration Prediction

The foregoing description has focused on estimation of the aircraft weight, using the aircraft's current acceleration determined by calculation based on Nx, a value sourced from the inertial sensors onboard the aircraft. However, the current acceleration used for this assessment does not provide a projection of what the future acceleration may be. This section will now describe how the processor is programmed to predict future acceleration, using the estimated aircraft weight obtained above. The following variables are useful in understanding how the processor estimates future acceleration Variables

| | |
|---|---|
| α | Angle of Attack |
| θ | Aircraft pitch angle |
| δ | Atmospheric pressure ratio |
| μ | Friction Coefficient (rolling or braking) |
| γ | Runway Slope (on ground) |
| γ | Flight Path Angle (in air) |
| a | Acceleration |
| $C_D$ | Coefficient of Drag |
| $C_L$ | Coefficient of Lift |
| D | Aerodynamic Drag |
| $F_n$ | Engine thrust (sometimes called T) |
| $F_{rsc}$ | Contaminant Drag |
| g | Gravity |
| M | Mach number |
| Q | Dynamic pressure |
| $S_{ref}$ | Wing reference area |
| W | Weight of the aircraft |
| $\frac{W}{g}\frac{dV}{dt}$ | Inertial force of the aircraft |

In addition to the above variables, the calculations performed by processor 12 also use a constant of 1481. This constant is a conversion factor, used to express aircraft speed as a Mach number. In the discussion which follows, the following relationships and reference equations may be helpful.

Dynamic pressure: $Q = \frac{1}{2} * \rho * V^2 = 1481 * \delta * M^2$

Aerodynamic drag:
$D = q * S_{ref} * C_D = 1481 * \delta * M^2 * S_{ref} * C_D$

Lift: $L = q * S_{ref} * C_L = 1481 * \delta * M^2 * S_{ref} * C_L$

Acceleration: $a = dV/dt$

Friction: $F_{fr} = \mu * F_{normal}$

Pitch: $\theta = \alpha + \gamma$

Analysis of Forces Acting on the Aircraft

Figure 5:
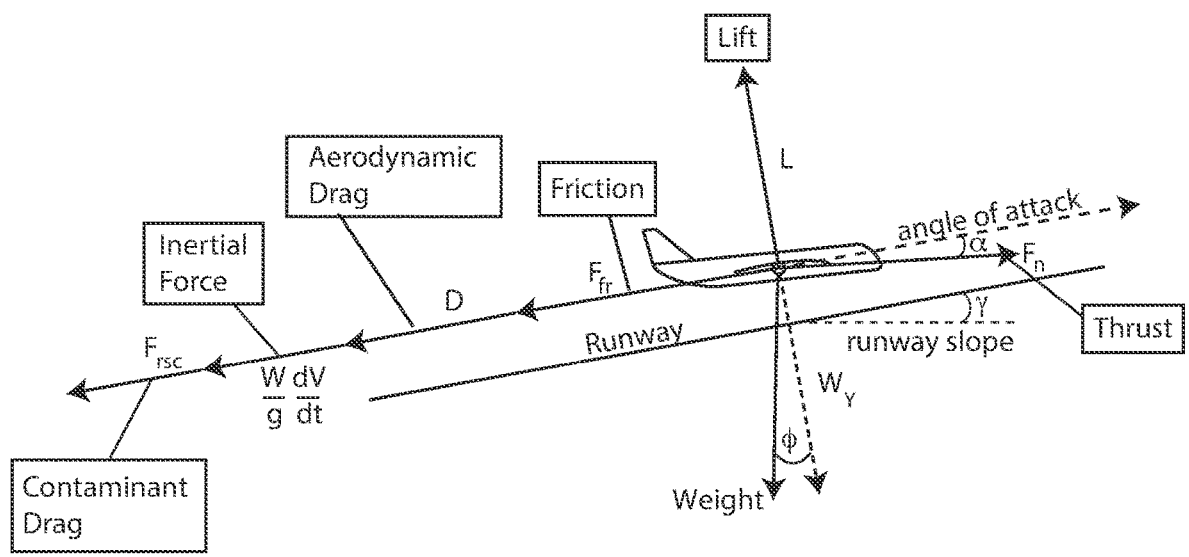
FIG. 5 is a more detailed free body diagram illustrating forces and angles used in the calculation of estimated acceleration.

Referring to FIG. 5, the forces acting on the aircraft in the longitudinal direction may be summarized as follows:

$$F_n * \cos\alpha - F_{fr} - D - F_{rsc} - W * \sin\gamma = \frac{W}{g}\frac{dV}{dt} \qquad \text{Eq. 8}$$

Expanding the friction force terms of Eq. 8, we get:

$$F_n * \cos\alpha - \mu * (W * \cos\gamma - L - F_n * \sin\alpha) - D - F_{rsc} - W\sin\gamma = W\frac{a}{g} \qquad \text{Eq. 8a}$$

Then dividing through by weight W and grouping like terms:

$$\frac{F_n}{W} * (\cos\alpha + \mu * \sin\alpha) - \frac{D + F_{rsc} - \mu * L}{W} - \mu * \cos\gamma - \sin\gamma = \frac{a}{g} \qquad \text{Eq. 8b}$$

Then expanding the lift and drag terms:

$$\frac{F_n}{W} * (\cos\alpha + \mu * \sin\alpha) - \qquad \text{Eq. 9}$$
$$\frac{F_{rsc} + 1481 * \delta * M^2 * S_{ref} * (C_D - \mu * C_L)}{W} - \mu * \cos\gamma - \sin\gamma = \frac{a}{g}$$

In Eq. 9, the known parameters are: μ, $F_{rsc}$, $S_{ref}$, $C_D$, $C_L$ and g. The parameters estimated using aircraft sensors and location data are: W, α, δ, M and γ. Using these known parameters and values obtained from the aircraft sensors, the processor 12 computes sum of the forces expressed in Eq. 9 as shown in FIG. 6 to provide an estimate of future acceleration.

Figure 6:
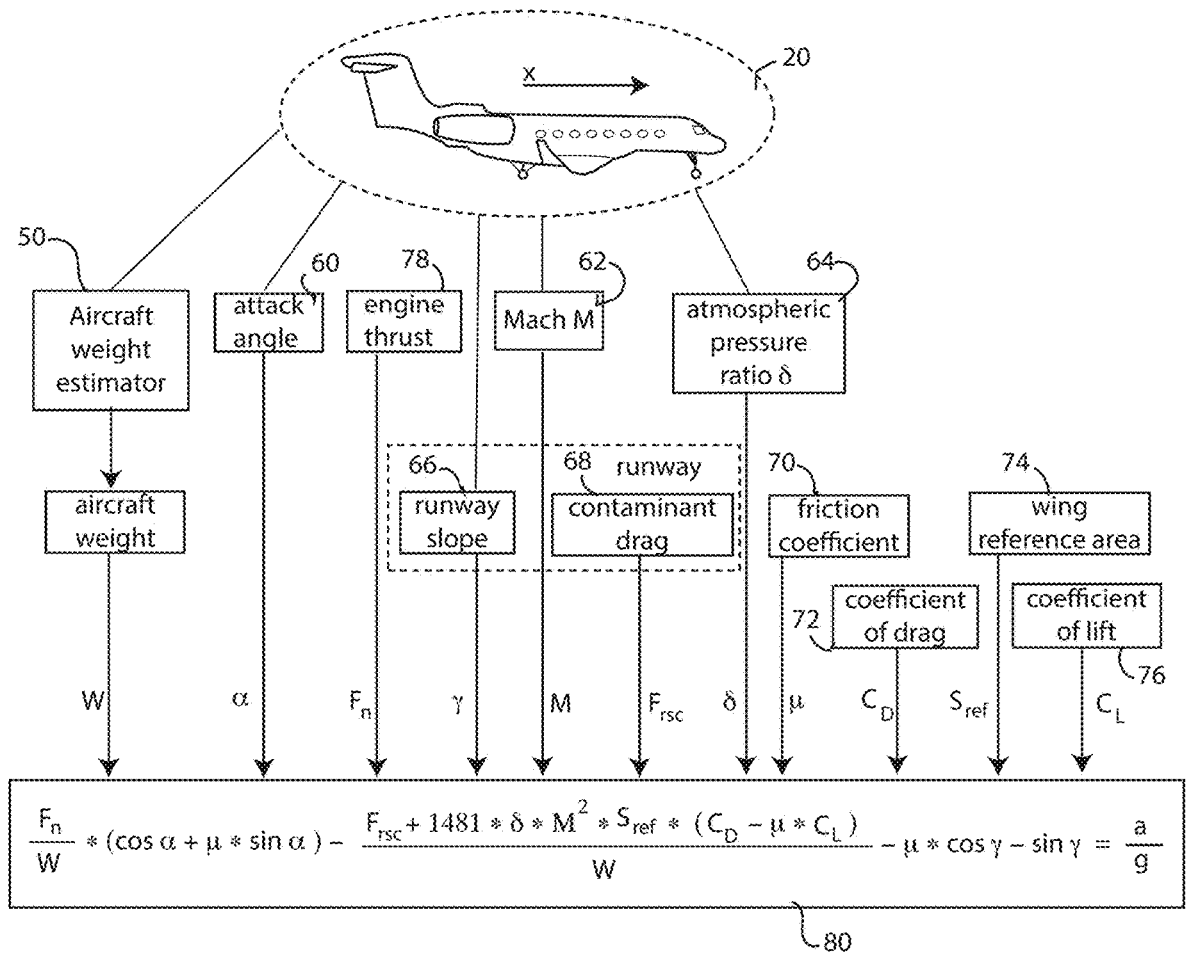
FIG. 6 is a detailed data flow diagram illustrating how the processor estimates future acceleration.

With reference to FIG. 6, notably the processor 12 has available to it the aircraft weight W, which the processor computed when performing the aircraft weight estimator process 50, discussed in connection with FIGS. 3 and 4. In addition the processor 12 has obtains data from onboard sensors, and also uses certain stored constants. Specifically, the following variables are obtained from sensors onboard aircraft 20:

Angle of attack 60
Mach 62
Atmospheric pressure ratio 64
Runway slope 66
The stored constants comprise the following:
Contaminant drag 68
Friction coefficient 70
Coefficient of drag 72
Wing reference area 74
Coefficient of lift 76

The processor uses these variables and constants, as illustrated in FIG. 6 to compute the predicted acceleration a in the acceleration prediction calculation 80. The calculation at 80 is based on Eq. 9 described above.

Determining Pertinent Reference Points

For distance predictions to be made, data from aircraft sensors (airspeed, EPR, temperature, etc) are used to determine the speed and acceleration of the aircraft at that exact point in time. The processor 12 then predicts the accelerate stop and accelerate go distance of the aircraft based on the assumption the pilot does not move the throttle unless he or she is aborting the takeoff. To predict these distances, the takeoff is divided into different segments. The acceleration equation is generic enough so it can be used for the entire takeoff. Some input parameters (e.g. $C_L$) are constant for certain segments but not all of them, and many of the parameters are a function of the aircraft speed or similar. Thus the acceleration is never constant.

FIG. 7 shows how the processor computes acceleration within each segment. Segments are labeled A-H in FIG. 7.

As illustrated, segment A applies from the beginning of take-off at the brake release BR when all engines are operational (AEO). If an engine were to fail during take-off, the speed at engine failure VEF is noted, and thus segment A represents the case where the velocity increases from brake release, up to the VEF speed (if applicable). During segment A, the Mach M and dynamic pressure Q are both increasing, thus these terms are relevant to the acceleration calculation shown in FIG. 6.

The thrust $F_N$ is present during segment A. In this case, with both engines operative (AEO) the $F_N$ represents the contribution from both engines ($F_N \times 2$). Thrust decreases as Mach increases, and vice versa. As illustrated the rolling friction coefficient $\mu$ is present during Segment A, as it is in segments B and C. The coefficient of lift $C_L$ and coefficient of drag $C_D$ are both constant during segment A, and also during segments B-F. The pitch due to runway slope $\gamma$ is assumed to be constant, and angle of attack $\alpha$ is assumed to be relatively constant in the illustrated embodiment. These assumptions are applied also during segments B-F. However, if desired these angles can be dynamically measured. Finally, segment A takes into account the runway condition, through the contaminant drag variable $F_{rsc}$. Some runway contaminants will cause impingement drag while the wheels are in contact with the ground. This drag is proportional to the speed of the aircraft. Contaminant drag is a factor during all segments except segment H, after the aircraft has left the ground.

The remaining segments B-H have other factors at play, as described in FIG. 7. Segment 8 pertains to the situation where an engine has failed, such that the aircraft is at some point operating with one engine inoperative (OEI). Segment B thus considers the case from the point that failure occurred, and thus applies to speeds beginning with the speed at engine failure VEF until the aircraft reaches the safety take-off speed V1. Note that the thrust value $F_N$ in this segment is half of that available in segment A. Segment C can be considered as the continuation of Segment A, in the even where both engines are operable (AEO). Segment C thus applies from the VEF speed until the aircraft reaches the safety take-off speed V1.

Segments D and E apply in the event the pilot elects to abort takeoff. Segment D applies in a condition where one engine is inoperative (OEI) and segment E applies in a condition where both engines are operative (AEO). Note that in these two segments, the braking coefficient of friction is used.

Segment F applies in a one engine inoperative (OEI) condition, between the point at which V1 speed is attained, until the pilot rotates the nose up at the VR speed. Segment G continues in the one engine inoperative (OEI) condition from the point at which VR speed is achieved until the liftoff speed VLOF has occurred. Rolling friction is still applicable in segments F and G.

Segment H applies in the one engine inoperative (OEI) condition once the aircraft has lifted off at the VLOF speed and has achieved an in flight speed V2. There is no rolling friction now that the aircraft is no longer touching the runway. Note that in segment H, as well as in preceding segment G, the horizontal thrust vector is a function of pitch.

The processor can assess accelerate go and accelerate stop conditions by selectively using the results of these segments. Accelerate go represents the concatenation of the following segments:

$$\text{Accelerate } Go = A+B+F+G+H$$

Accelerate Stop represents the longer of the OEI and AEO distances:

$$\text{OEI Distance} = A+B+D$$

$$\text{AEO Distance} = A+C+E$$

Processor 12 having estimated the aircraft weight using inertial sensor data (e.g., $N_x$) and having used that estimated weight to predict future acceleration (i.e., at unreached points further down the runway), the processor 12 then uses its acceleration prediction capability to calculate where various warning reference distances are located. Essentially, the processor determines at what distance from the aircraft's current position will the aircraft velocity be equal to some predefined reference condition. For example, at what distance from the aircraft's current position will the V1 speed will be achieved; or at what distance from the aircraft's current position will come to a full stop if take-off is aborted now. Each of the predefined reference conditions corresponds to a different scenario, where different physical conditions may or may not come into play. To take into account the different physical conditions at play from instant to instant, the processor breaks down each scenario into one or more different segments, as will be discussed more fully below.

Integrating Predicted Acceleration

To determine the distance at which a certain velocity will be achieved, the processor integrates the acceleration to derive the velocity produced by that acceleration, and then integrates the derived velocity to derive the distance traveled. Essentially, the processor uses Eq. 9 to compute the acceleration a for a given time interval (e.g., one second) and uses the relationship a=dv/dt to determine how much the velocity will have increased (dv). The processor keeps a running total of these incremental increases in velocity, and associates that running total with the amount of time elapsed. The processor also computes for each distance traveled during that increment of elapsed time, using the relationship $s=\frac{1}{2}at^2$. The processor maintains a running total of these incremental distances as well.

Figure 8:
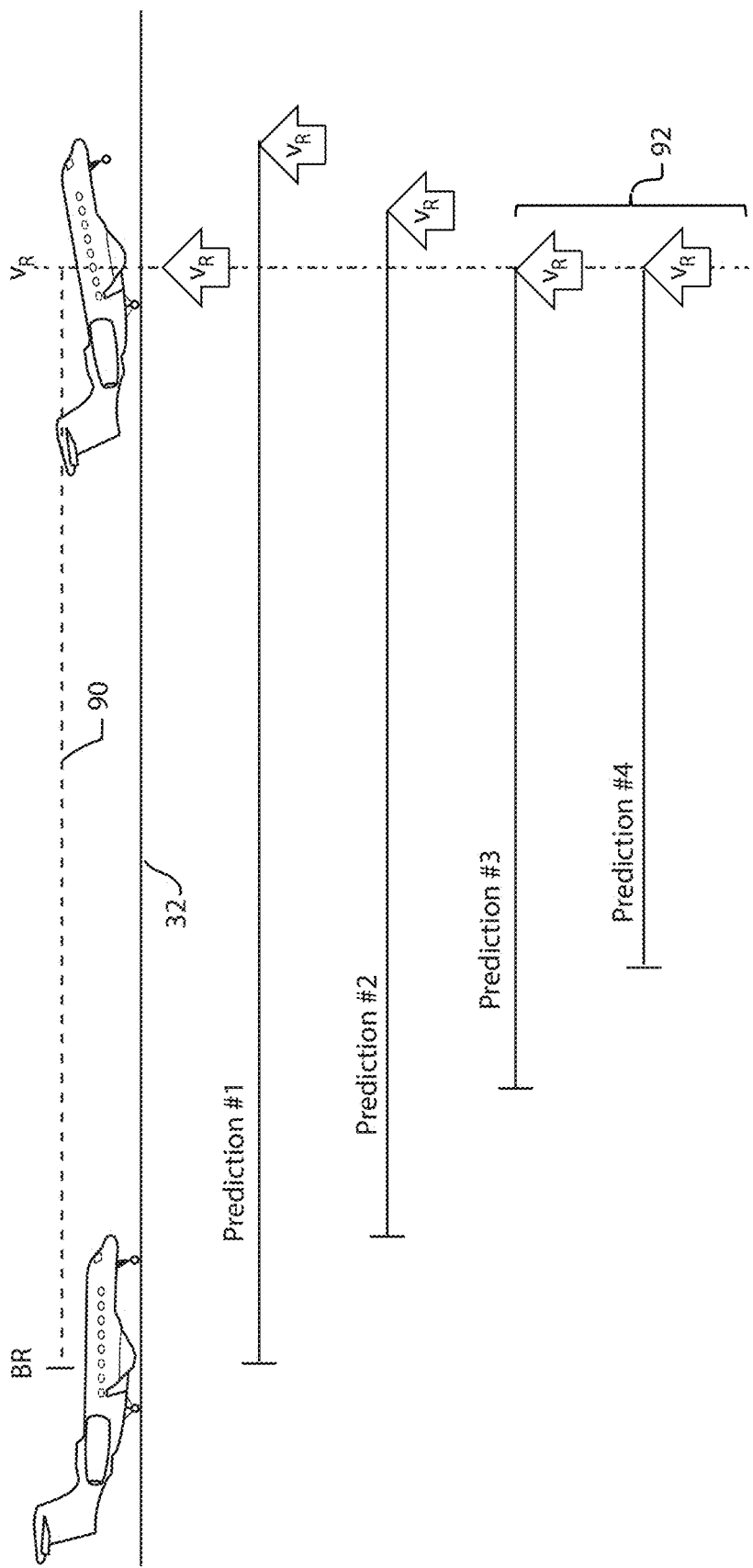
FIG. 8 is a series of graphs showing how take-off distance prediction become more accurate after multiple iterations by the processor.

Once the running velocity total reaches the reference velocity of interest (e.g., V1, $V_R$, etc.) the processor uses the current running distance total as the distance from the starting point at which the velocity of interest will be reached. The processor performs these integrations much faster than the one-second intervals being modeled. Thus the processor obtains reliable solutions for each of the safety reference points long before those points are actually reached. In practice, these computed solutions are iteratively computed over and over as the aircraft proceeds down the runway. With each iteration, the accuracy of the prediction becomes more reliable and ultimately the solutions converge on highly accurate final solutions, as illustrated in FIG. 8. In FIG. 8, several successive predictions (prediction #1-prediction #4) are illustrated as the aircraft proceeds down the runway 32. Each prediction represents the point at which the aircraft will attain the $V_R$ speed applicable at nose rotation. For comparison, the dashed line represents the independently measured traverse from brake release BR to $V_R$ based on aircraft instrumentation system data from brake release to $V_R$. Note that in the early predictions (Prediction #1 and Prediction #2) the processor calculates a projected location for attainment of the $V_R$ speed that is farther than shown by the reference line 90. However, eventually, the prediction solutions generated by the processor converge on a much more accurate result, as shown at 92.

In performing integration of the predicted acceleration to determine velocity and distance traveled, the processor is operating on the multi-factor relationship described in Eq. 9. Acceleration is not constant, because there are several physical properties that are dependent on aircraft speed and because different conditions may be applicable within each segment. If the aircraft is in contact with the runway, rolling frictional forces affect the acceleration; if the aircraft has rotated to a nose up condition, different rolling frictional forces affect acceleration; and if the aircraft has reached liftoff, then rolling frictional forces are no longer present. To address the fact that acceleration is not constant, the processor 12 computes all predicted reference points by computing the predicted distance traveled in short increments of time, each time computing a new acceleration value, while taking the current segment conditions into account.

Accelerate-Go and Accelerate-Stop

In addition to the reference points depicted in FIG. 1, pilots also may need to be aware of other distances such as the accelerate-go distance and the accelerate-stop distance, both of which are relevant in the event of an engine failure. The accelerate-go distance is defined as the distance to accelerate (using two engines) to a speed known as the VEF speed at which an engine fails, and there after continuing to take off to a predetermined screen height—this is called a continued take-off or CTO. The accelerate-stop distance is defined as the longer of:

(a) the distance to accelerate (using two engines) to the V1 speed, and then abort takeoff and come to a full stop, or (b) the distance to accelerate (using two engines) to a VEF speed at which an engine fails, abort takeoff and come to a full stop. These maneuvers are referred to as a rejected takeoff or RTO.

In order to make the accelerate-go and accelerate-stop calculations, the following segment distances are relevant.

| Segment Label | Definition |
|---|---|
| A | Brake release to VEF |
| B | VEF to V1 (one engine inoperative) |
| C | VEF to V1 (all engines operative) |
| D | V1 to full stop (one engine inoperative) |
| E | V1 to full stop (all engines operative) |
| F | V1 to VR (one engine inoperative |
| G | VR to VLOF (one engine inoperative) |
| H | VLOF to V2 (one engine inoperative, in-flight |

In the above table, VEF refers to the speed at which an engine fails; VR refers to the speed at which the pilot manipulates the controls to make the aircraft nose pitch up; VLOF refers to the lift-off speed at which the main gear has left the ground.

The processor 12 uses the projected acceleration as determined above in Eq. 9, repeated below for convenience:

$$\frac{F_n}{W}*(\cos\alpha + \mu*\sin\alpha) - \frac{F_{rsc} + 1481*\delta*M^2*S_{ref}*(C_D - \mu*C_L)}{W} - \mu*\cos\gamma - \sin\gamma = \frac{a}{g} \qquad \text{Eq. 9}$$

In the above Eq. 9 the following are constants:
  δ—atmospheric pressure ratio
  g—gravity
  $S_{ref}$—wing reference area
  W—weight of aircraft—as determined by the processor as described above.

Figure 9:
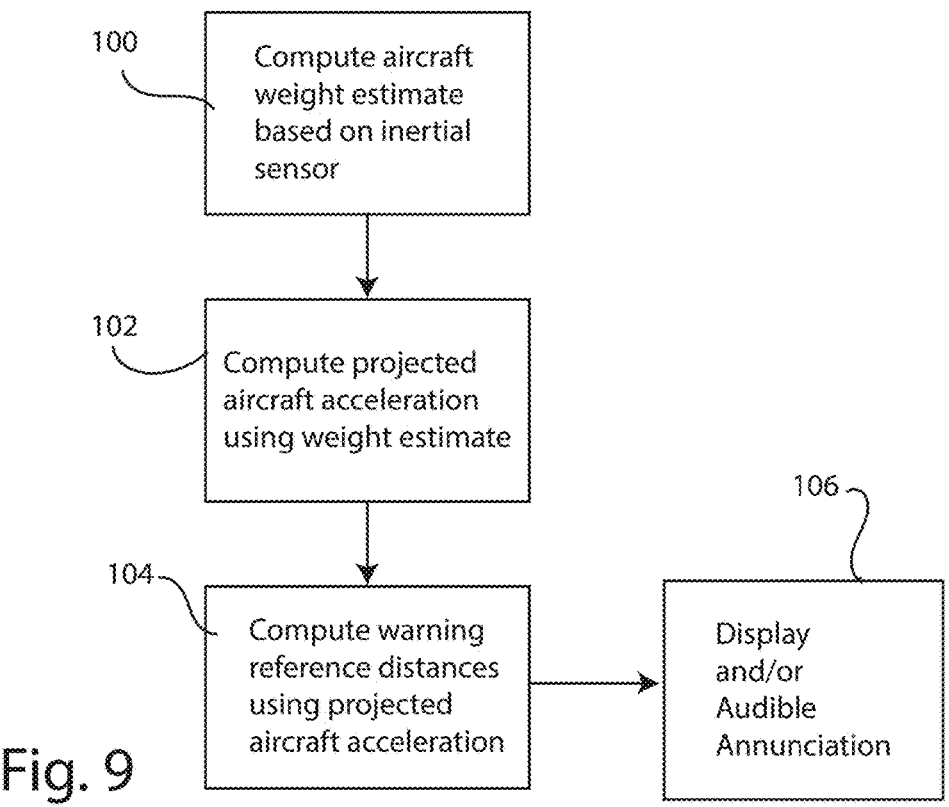
FIG. 9 is a flow chart summarizing the steps performed by the processor in estimating aircraft weight, computing projected acceleration and computing the take-off warning reference distances.

The remaining values used in the distance calculations are speed or segment dependent:
  μ—friction coefficient
  $F_n$—engine thrust
  $F_{rsc}$—contaminant drag
  M—Mach number
  Q—dynamic pressure
  $C_D$—coefficient of drag
  $C_L$—coefficient of lift
  γ—pitch angle
  α—angle of attack Summary of Process FIG. 9 summarizes how the processor is programmed to produce the example displays depicted in FIG. 1. As discussed above, the processor first computes, at step 100, an independent estimate of the aircraft weight, based on information from inertia sensors, if possible. This step avoids the need to rely on potentially erroneous weight estimates provided by the pilot.

Next, at step 102, the processor computes the projected aircraft acceleration using the weight estimate obtained in step 100. The computation of projected aircraft acceleration takes into account many factors, discussed in FIG. 8. Each of these factors is not always applicable, and several of them will change based on aircraft speed and changes in pressure, and based upon runway angle and angle of attack.

Next, at step 104, the processor computes a set of warning reference distance predictions, using the projected acceleration values from step 102. In performing steps 102 and 104, the processor applies the acceleration and warning reference distance calculations in context of whether the aircraft is in contact with the ground, whether all engines are operating properly, whether the pilot has aborted the take-off. These are designated as segments in the above discussion.

Finally, at step 106, the results of the warning reference distance calculations of step 104 are used by the processor to generate a graphical display, such as those illustrated in FIG. 1, and also to cause stored annunciation messages to be played through the aircraft's alerting system 16 through a suitable audio interface 14 under control of processor 12.

Example Use Cases

The disclosed take-off performance prediction and alerting system helps ensure safe take-offs by alerting the pilot in a variety of situations. For example, there are situations where the useable length of the runway may not be as assumed. This can occur because the pilot taxied to the wrong runway, or turned onto the runway heading in the wrong direction at an intersection, or entered the runway at the wrong intersection. When such mistakes occur, the disclosed alerting system uses the aircraft's known GPS position, identifies from map data which runway the aircraft is situated and predicts where the safety take-off speed will occur. The system immediately alerts the pilot if is in a Yellow or Red alert zone (FIG. 1 at frames B, C or D). In this way, the pilot knows before the refusal point or stop point that something is wrong.

In other situations, the engine thrust may be insufficient for reasons not immediately apparent to the pilot. The thrust may have been computed for a first runway, but before take-off the plane is redirected to a different, shorter runway which requires greater engine thrust for take-off. The thrust may also be incorrect for current runway conditions, such as slush on the runway which creates additional drag as the aircraft proceeds down the runway. Failure to engage the engine anti-ice system can result in insufficient thrust for safe take-off and climb. The disclosed alerting system monitors the aircraft's movement in the inertia reference frame of its inertial sensors and this the system predicts where the safety take-off speed will actually occur, and this point may be well beyond the normal point, due to insufficient engine thrust. Again, the system alerts the pilot if the aircraft has entered into a Yellow or Red alert situation (FIG. 1, frames B, C or D).

Still other potentially hazardous situations can occur due to pilot or ground crew confusion or mistake. If the pilot incorrectly enters the outside air temperature into the flight management computer, or if the pilot enters the wrong aircraft weight, the computed thrust and associated take-off reference speeds will be wrong. As noted previously, aircraft weight can be difficult to assess because the weight of the passengers and their carry-on items is typically not precisely known. In addition, if the fuel weight or cargo weight is inadvertently omitted from the weight assessment, this can result in a significant undercalculation of the thrust required. The disclosed alerting system determines the aircraft weight using inertial sensors, rather than relying on pilot-entered values. Thus, if the thrust, based on pilot-entered information, is insufficient, the alerting system warns that the safety take-off speed and/or stop point or refusal point will occur at unsafe distances by issuing a Yellow or Red alert condition.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. An aircraft take-off awareness system to predict and inform a pilot about where on a runway certain safety speeds will be achieved, comprising:
    a processor coupled to receive inertial data from an aircraft and programmed to compute a current acceleration estimate during take-off based at least in part upon the inertial data;
    the processor being further programmed to compute an aircraft weight estimate during take-off based at least in part on the computed current acceleration estimate and a slope of the runway relative to a horizontal reference frame;
    the processor being further programmed to compute a future acceleration prediction based on the computed aircraft weight estimate;
    the processor being further programmed to compute and inform the pilot about at least one warning reference distance using the computed future acceleration prediction, the warning reference distance corresponding to predicted positions on the runway at which said certain safety speeds will be achieved.

2. The system of claim 1 wherein the processor is programmed to compute the aircraft weight estimate further based on a computed thrust estimation, and a computed drag estimation.

3. The system of claim 1 wherein the processor is programmed to determine the slope of the runway relative to the horizontal reference frame from an angle of an aircraft movement vector in a vertical plane relative to the horizontal reference plane during take-off.

4. The system of claim 1 wherein the processor is programmed to compute the future acceleration prediction further based on factors selected from the group consisting of aircraft speed, dynamic pressure, engine thrust, rolling friction, braking friction, coefficient of lift, coefficient of drag, runway contaminant friction, aircraft attack angle and combinations thereof.

5. The system of claim 4 wherein the processor is programmed to selectively use factors from said group according to predefined segments, each corresponding to different aircraft speed and engine operating conditions.

6. The system of claim 1 wherein the processor is programmed to generate a display to inform the pilot about the at least one warning reference distance, wherein the display provides a rendered plan view of the runway with moving aircraft icon to illustrate the aircraft's current runway position, and wherein the processor is programmed to display a moving reference marker at positions upon the runway corresponding to the predicted positions on the runway at which said certain safety speeds will be achieved.

7. The system of claim 6 wherein the processor is further programmed to generate additional warning symbols on the display when at least one of the reference markers is no longer on the runway.

8. The system of claim 1 wherein the processor is programmed to generate audible annunciations when certain predefined conditions exist regarding the predicted positions on the runway at which said certain safety speeds will be achieved.

9. The system of claim 1 wherein the processor is programmed to continuously compute and update the future acceleration prediction and the warning reference distances substantially throughout the duration of aircraft take-off.

10. The system of claim 1 wherein the processor is programmed to compute a warning reference distance corresponding to safety speeds selected from the group consisting of take-off decision speed, rotation speed, liftoff speed, and take-off safety speed with one engine inoperative.

11. A method of determining a location along a runway at which certain speeds will be achieved, comprising:
    using a processor to compute a current acceleration estimate during take-off based at least in part upon inertial data obtained from inertial sensors onboard an aircraft;
    using the processor to compute an aircraft weight estimate during take-off based at least in part upon the computed current acceleration estimate and a slope of the runway relative to a horizontal reference frame;

using the processor to compute a future acceleration prediction based on the computed aircraft weight estimate; and using the processor being to compute at least one warning reference distance using the computed future acceleration prediction, the warning reference distances corresponding to predicted positions along the runway at which said certain safety speed will be achieved.

12. The method of claim 11 further comprising computing the aircraft weight estimate by computing a thrust estimate and a drag estimate.

13. The method of claim 11 wherein the slope of the runway relative to the horizontal reference frame is determined from an angle of an aircraft movement vector in a vertical plane relative to the horizontal reference plane during take-off.

14. The method of claim 11 further comprising computing the future acceleration prediction based on factors selected from the group consisting of aircraft speed, dynamic pressure, engine thrust, rolling friction, braking friction, coefficient of lift, coefficient of drag, runway contaminant friction, aircraft attack angle and combinations thereof.

15. The method of claim 14 further comprising selectively using factors from said group according to predefined segments, each corresponding to different aircraft speed and engine operating conditions.

16. The method of claim 11 further comprising using the processor to generate a display to inform a pilot about the at least one warning reference distance.

17. The method of claim 11 further comprising using the processor to generate audible annunciations when certain predefined conditions exist regarding the predicted positions on the runway at which said certain safety speeds will be achieved.

18. The method of claim 11 further comprising computing a warning reference distance corresponding to safety speeds selected from the group consisting of take-off decision speed, rotation speed, liftoff speed, and take-off safety speed with one engine inoperative.

19. An aircraft take-off awareness system to predict and inform a pilot about where on a runway certain safety speeds will be achieved, comprising:

a processor coupled to receive inertial data from an aircraft and programmed to compute a current acceleration estimate during take-off based at least in part upon the inertial data;

the processor being further programmed to compute an aircraft weight estimate during take-off based at least in part on the computed current acceleration estimate, a slope of the runway relative to a horizontal reference frame, a thrust estimate, and a drag estimate.

20. The system of claim 19 wherein the processor is programmed to determine the slope of the runway relative to the horizontal reference frame from an angle of an aircraft movement vector in a vertical plane relative to the horizontal reference plane during take-off.

* * * * *